(12) United States Patent
Harris et al.

(10) Patent No.: US 7,866,147 B2
(45) Date of Patent: Jan. 11, 2011

(54) SIDE BRANCH ABSORBER FOR EXHAUST MANIFOLD OF TWO-STROKE INTERNAL COMBUSTION ENGINE

(75) Inventors: Ralph E. Harris, San Antonio, TX (US); Eugene L. Broerman, III, San Antonio, TX (US); Gary D. Bourn, Laramie, WY (US)

(73) Assignee: Southwest Research Institute, San Antonio, TX (US)

( * ) Notice: Subject to any disclaimer, the term of this patent is extended or adjusted under 35 U.S.C. 154(b) by 919 days.

(21) Appl. No.: 11/541,008

(22) Filed: Sep. 29, 2006

(65) Prior Publication Data

US 2007/0101706 A1    May 10, 2007

Related U.S. Application Data

(60) Provisional application No. 60/722,479, filed on Sep. 30, 2005.

(51) Int. Cl.
*F02B 27/04* (2006.01)
*F02B 27/02* (2006.01)
*F01M 15/00* (2006.01)
*F01N 1/08* (2006.01)

(52) U.S. Cl. .............................. 60/312; 60/273; 60/314; 73/114.76; 181/276

(58) Field of Classification Search ................ 60/312, 60/273, 314; 73/114.76; 181/228, 276, 286
See application file for complete search history.

(56) References Cited

U.S. PATENT DOCUMENTS

| | | | |
|---|---|---|---|
| 5,119,427 A | 6/1992 | Hersh et al. ................... 381/71 |
| 5,471,400 A | 11/1995 | Smalley et al. ............... 364/509 |
| 6,453,695 B1 | 9/2002 | Marks et al. ................ 62/323.1 |
| 6,533,064 B1 | 3/2003 | Kim et al. .................... 181/250 |
| 6,546,729 B2 | 4/2003 | Hellat et al. .................. 60/725 |
| 6,634,457 B2 | 10/2003 | Paschereit et al. ........... 181/229 |
| 6,799,657 B2 | 10/2004 | Daniels ....................... 181/252 |
| 6,814,041 B1 * | 11/2004 | Cheng et al. ........... 123/184.57 |
| 6,935,848 B2 | 8/2005 | Marshall et al. ............. 417/412 |
| 7,055,484 B2 | 6/2006 | Marks et al. ........... 123/184.57 |
| 7,246,680 B2 * | 7/2007 | Osterkamp et al. .......... 181/250 |

(Continued)

FOREIGN PATENT DOCUMENTS

JP    2004037313    2/2004

(Continued)

OTHER PUBLICATIONS

Bedout et al., "Adaptive-Passive Noise Control With Self-Tuning Helmholtz Resonators", Journal of Sound and Vibration 202(1), pp. 109-123, 1997.

(Continued)

*Primary Examiner*—Thomas E Denion
*Assistant Examiner*—Audrey Klasterka
(74) *Attorney, Agent, or Firm*—Ann C. Livingston

(57) ABSTRACT

A method of improving scavenging operation of a two-stroke internal combustion engine. The exhaust pressure of the engine is analyzed to determine if there is a pulsation frequency. Acoustic modeling is used to design an absorber. An appropriately designed side branch absorber may be attached to the exhaust manifold.

4 Claims, 3 Drawing Sheets

U.S. PATENT DOCUMENTS

| | | | |
|---|---|---|---|
| 2004/0065303 A1* | 4/2004 | Russell et al. | 123/480 |
| 2005/0008512 A1 | 1/2005 | McGill et al. | 417/416 |
| 2007/0130926 A1* | 6/2007 | Jett | 60/312 |
| 2007/0289653 A1 | 12/2007 | Harris et al. | |
| 2008/0253900 A1 | 10/2008 | Harris et al. | |

FOREIGN PATENT DOCUMENTS

| | | |
|---|---|---|
| WO | 01/44681 A2 | 6/2001 |

OTHER PUBLICATIONS

Deffenbaugh et al., "Compression Technology for the Next Generation", Technology Today, pp. 14-18, 2005.

Esteve et al., "Adaptive Helmholtz Resonators and Passive Vibration Absorbers for Cylinder Interior Noise Control", Journal of Sound and Vibration, www.sciencedirect.com, 22 pages, Oct. 12, 2007.

* cited by examiner

SIDE BRANCH ABSORBER FOR EXHAUST MANIFOLD OF TWO-STROKE INTERNAL COMBUSTION ENGINE

RELATED PATENT APPLICATION

This application claims the benefit of U.S. Provisional Application No. 60/722,479, filed Sep. 30, 2005 and entitled "Side Branch Absorber For Exhaust Manifold of Two-Stroke Internal Combustion Engine."

GOVERNMENT LICENSE RIGHTS

The U.S. Government has a paid-up license in this invention and the right in certain circumstances to require the patent owner to license others on reasonable terms as provided for by the terms of Contract No. DE-FC26-02NT41646 for the United States Department of Energy.

TECHNICAL FIELD OF THE INVENTION

This invention relates to control systems for internal combustion engines, and more particularly to a method for using a side branch absorber at the exhaust manifold of a two-stroke internal combustion engine to dampen resonant pulsations.

BACKGROUND OF THE INVENTION

The gas transmission industry operates over 4,000 integral engine compressors, the majority being two-stroke, with a median age of 45 years and a median size of 2000 horsepower. These engines pump a large portion of the natural gas presently consumed in the United States. These engines are no longer produced, and with the projections for future increased demand of natural gas and the expense of replacement, it would be advantageous to modernize the existing fleet to allow for continued operation with increased efficiency and emissions compliance.

Integral gas compression engines have historically exhibited poor performance and high emissions, due in part to poor engine control. The end results are misfires and partial burns that lead to increased fuel usage and exhaust emissions. Many of the slow-speed integral engines in the gas compression industry use control systems that are outdated and slow.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a side branch absorber attached to the exhaust manifold of a two-stroke internal combustion engine. The effect of the absorber is to dampen resonant pulsations that adversely affect scavenging during engine operation.

As explained below, the absorber is similar in principle to a Helmholtz resonator. In general terms, a Helmholtz absorber is an enclosure with a port to couple a volume of airspace in the enclosure to another airspace. The resonant frequency of the absorber is controlled by the depth of the enclosed airspace in the box behind the port and the width and depth of the port.

For purposes of the present invention, the absorber is designed to dampen the frequency response exhibited within an exhaust system of an engine. It is a "side branch" absorber in the sense that it is oriented perpendicular to the air flow within "exhaust runners" that carry exhaust gas from the engine cylinders to the exhaust manifold.

The absorber is especially designed for stationary two-stroke internal combustion engines. Stationary engines are typically loaded by equipment such as compressors, pumps, or generators. However, without undue experimentation, significant inventive concepts of designing and using an absorber to damp pulsations within an exhaust system may be shown to be applicable to other engines.

Figure 1:
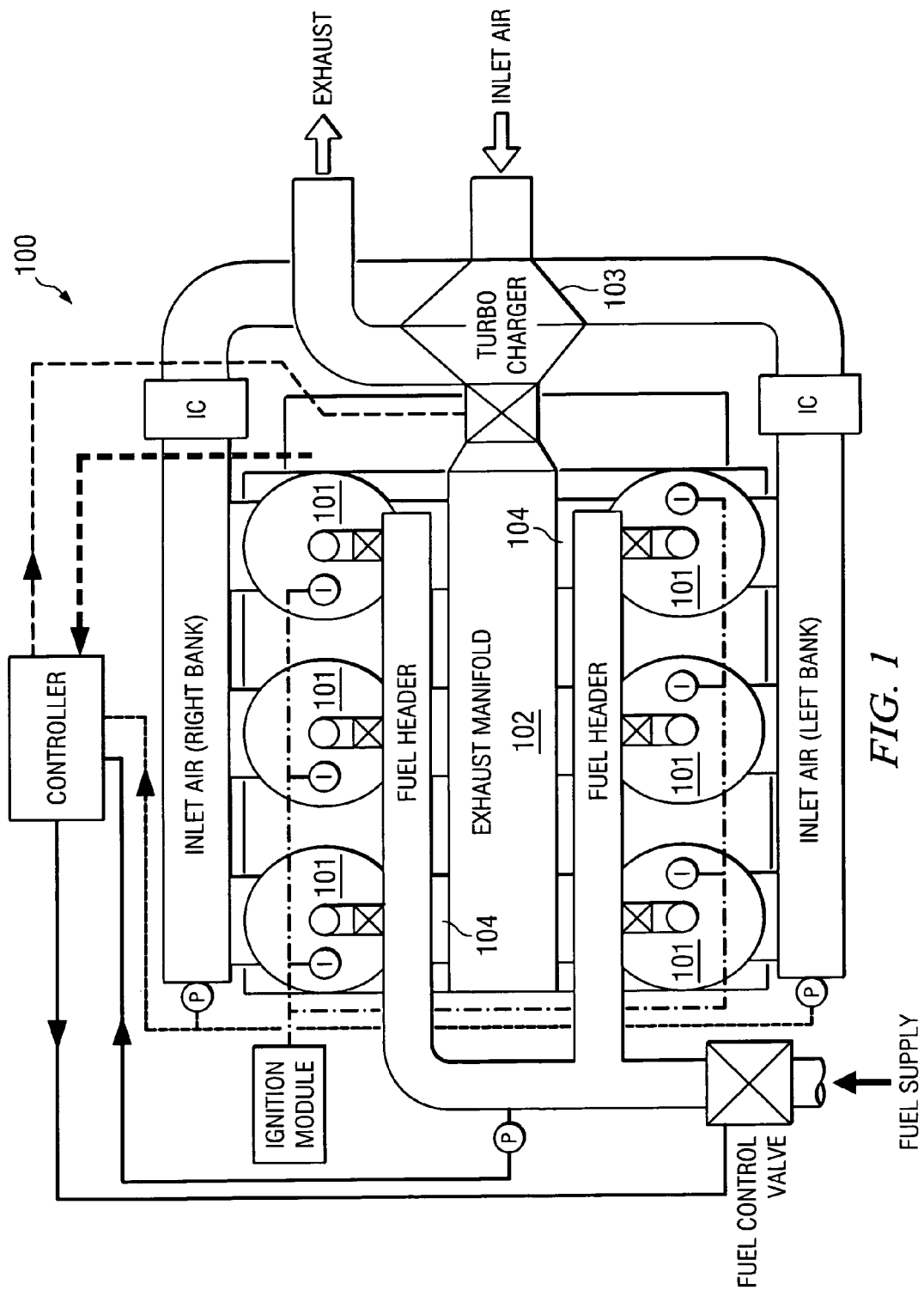
FIG. 1 illustrates an example of a two-stroke internal combustion engine.

FIG. 1 illustrates an example of an engine 100, with which the invention is used. Engine 100 is a spark-ignited lean-burn two-stroke stationary engine. An example of such an engine is an integral compressor engine running on natural gas. It has six power cylinders 101, and uses a turbocharger 103 for scavenging. A commercially available engine of this type is the Cooper-Bessemer Legacy GMV integral engine, a product of the Cooper Cameron Corporation.

Engine 100 has an exhaust manifold 102 and exhaust runners 104, which carry exhaust from the cylinders 101 to the manifold 102. Engine 100 operates in accordance with the two-stroke principle of using intake air to clean or "scavenge" the cylinders 101 of exhaust gases.

Figure 2:
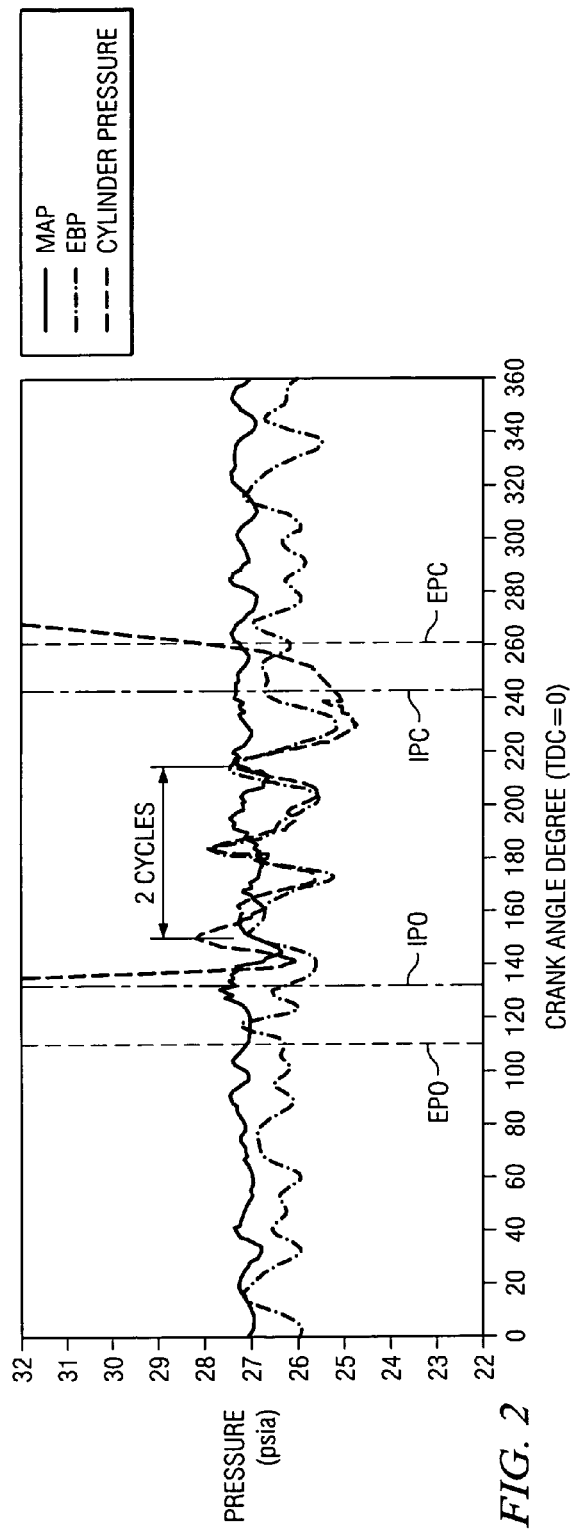
FIG. 2 is a plot of exhaust back pressure and cylinder pressure as functions of crank angle degree, for the engine of FIG. 1.

FIG. 2 illustrates a plot of measured exhaust back pressure (EBP) of engine 100 as a function of crank angle degree. Plots are also shown of manifold intake air pressure (MAP) and of in-cylinder (combustion chamber) pressure. For EBP measurement, exhaust pressure may be measured dynamically in any of the six exhaust runners 104. The pressures are shown in psia, and the crank angle degree is relative to top dead center (TDC)=0.

FIG. 2 further indicates the timing (in crank angle degrees) of various two-stroke operations. Exhaust Port Open (EPO) occurs near 110 degrees, and Exhaust Port Closed (EPC) occurs near 260 degrees. Inlet Port Open (IPO) is near 135 degrees, and Inlet Port Closed (IPC) is near 245 degrees.

As shown in FIG. 2, the exhaust back pressure undergoes two distinct cycles between crank angle degrees of about 150 and 216 (66 degrees). This is during the time when the inlet port is open, and thus during the scavenging cycle.

The engine speed during the measurements was 330 revolutions per minutes. Thus, the frequency of the cycles may be calculated as:

$$2 \text{ cycles}/66 \text{ degrees} \times 360 \text{ degrees/rev} \times 330 \text{ rev/min} \times 1 \text{ min}/60 \text{ sec} = 60 \text{ Hz}$$

This frequency is referred to herein as the "pulsation frequency" during scavenging.

As illustrated, the cylinder pressure and the exhaust back pressure both exhibit the pulsation frequency. This indicates that the pulsations have a systematic effect; that is, they are indicated in both the exhaust system and in the cylinder-piston system.

Figure 3:
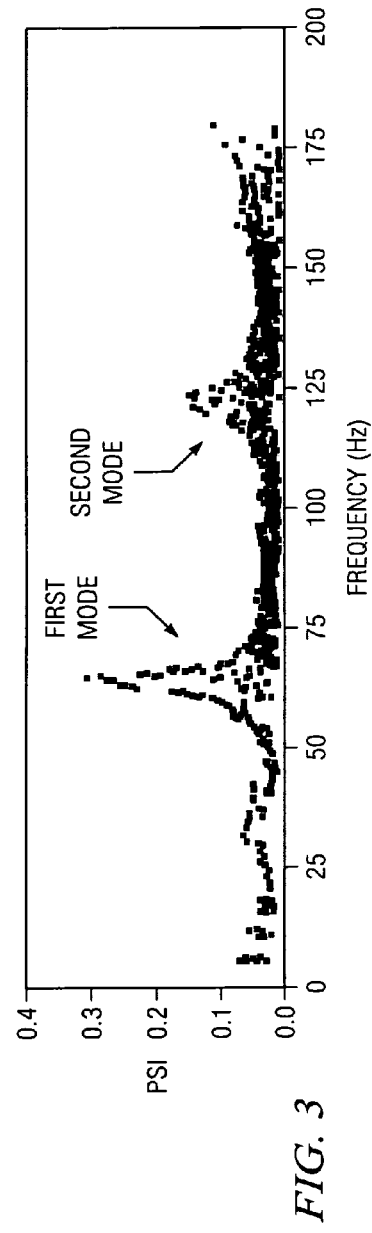
FIG. 3 is a frequency analysis of the exhaust pressure, illustrating its resonant modes.

FIG. 3 illustrates how the dynamic exhaust pressure data may be analyzed in the frequency domain, finding the pulsation frequency to be resonant. A first mode occurs at approximately 64 Hz, and a second mode occurs at approximately 124 Hz.

Using acoustic modeling techniques and appropriate processing hardware and software, the exhaust manifold 102 may be modeled and dynamically simulated. The acoustic model is then used to design an absorber to mitigate the pulsating exhaust pressure.

Thus, a feature of the invention is the recognition that the pressure changes in runners 104, exhibited as a pulsation frequency, adversely affects the scavenging operation of the cylinders 101. It is further recognized that acoustic modeling may be used to design an appropriate absorber.

Figure 4:
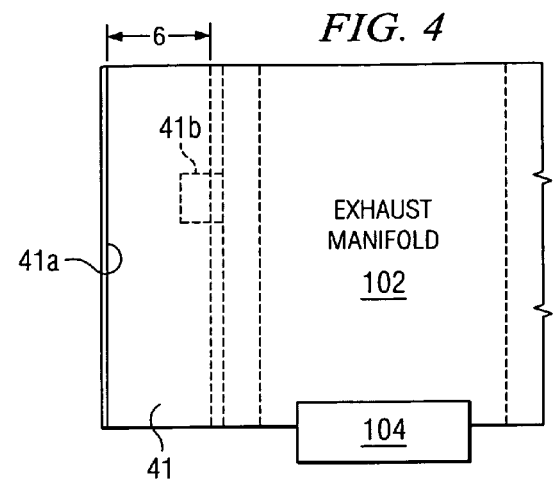
FIG. 4 illustrates an example of a side branch absorber, designed in accordance with the invention and attached to the exhaust manifold of the engine of FIG. 1.

FIG. 4 illustrates one example of a side branch absorber 41, designed in accordance with the invention, and installed on an exhaust manifold 102. As illustrated, absorber 41 comprises a chamber 41a and a choke tube 41b. The choke tube 41b provides a port from the chamber 41a to the exhaust manifold 102.

In effect, absorber 41 is a volume 41a separated from exhaust manifold 102 by means of choke tube 41b. In the example of this description, the design of engine 100 provides a convenient attachment location for absorber 41 at the end of exhaust manifold 102. In other embodiments, absorber 41 could be connected at other locations on the exhaust manifold 102 or elsewhere in the exhaust system. A particular engine design may facilitate placement of an in-line absorber.

Because of the nature of the exhaust gas environment in which absorber 41 is placed, it is made from a material capable of withstanding high temperatures, such as steel. The attachment of absorber 41 may be by various means, such as by means of bolts.

For the example of this description, the acoustic dimensions of the chamber 41a are 6" of Schedule 40 steel pipe having an inner diameter of 28". This 28" inner diameter is substantially the same as the diameter of the end of exhaust manifold 102, permitting it to be easily bolted to the manifold. The acoustic dimensions of choke tube 41b are 4.7" of Schedule 40 steel pipe having an inner diameter of 3". The Schedule 40 characteristic of the pipe reflects its thickness and pressure capabilities, and the pipe is but one example of a geometry and material suitable for use with engine 100.

The physical dimensions of choke tube 41b are not necessarily the same as the acoustic dimensions. In this example, the physical length of choke tube 41b is 2.7". The acoustic dimensions and the resulting physical dimensions are determined by the acoustic model for the particular engine and its exhaust pressure characteristics. The length and diameter of the choke tube 41b are critical to the damping effect, and vary depending on the frequency desired to be dampened, with the volume of chamber 41a being another factor.

Figure 5A:
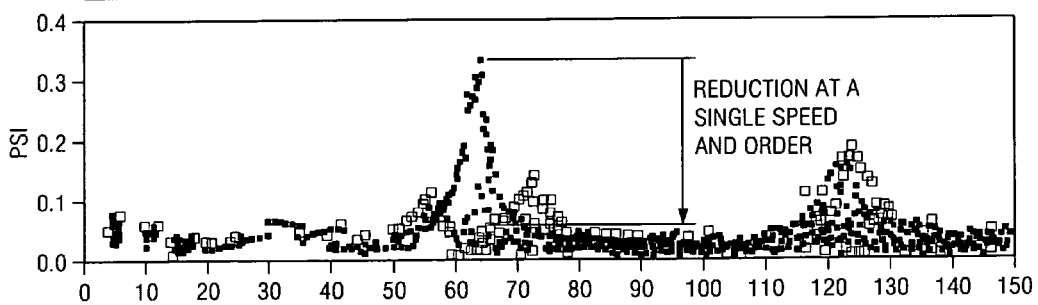
FIGS. 5A and 5B illustrate the damping effect of the absorber.
Figure 5B:
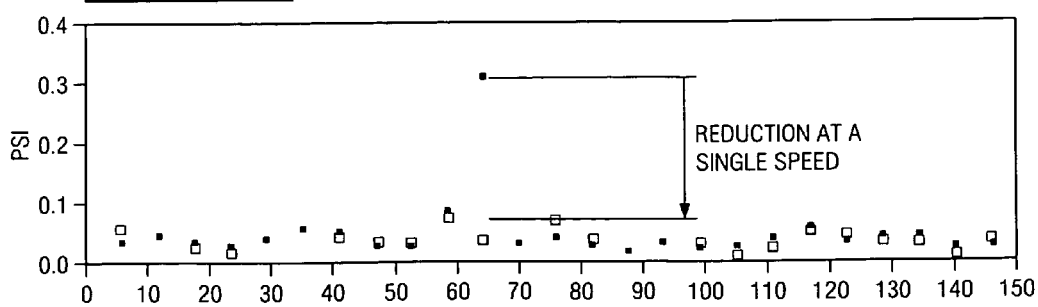

FIGS. 5A and 5B illustrate the results of computer analysis of the effects of the side branch absorber 41 on exhaust pressure. In FIG. 5A, pressure is shown to be reduced at a single engine speed and order. The "order" reflects a certain speed and firing speed of the engine 100. In FIG. 5B, pressure is shown to be reduced at a single engine speed.

In other embodiments, multiple side branch absorbers having different acoustic dimensions could be attached to the exhaust manifold to dampen pulsations at different engine speeds. Also, one or more side branch absorbers could be attached to the exhaust system at locations other than directly to the exhaust manifold.

The invention claimed is:

1. A method of damping pulsations associated with operation of a two-stroke stationary gas compression engine having a scavenging phase, the engine having exhaust runners that carry exhaust from cylinders to an exhaust manifold, the exhaust manifold being generally cylindrical and having two ends and side walls such that the runners deliver exhaust into side walls, comprising:
    determining a resonant pulsation frequency associated with the engine during the scavenging phase, by measuring exhaust back pressure in at least one runner as a function of crank angle;
    using the resonant pulsation frequency to determine the volume depth for a side branch absorber to dampen pulsations and to be attached to one end of the manifold, the volume being generally cylindrical and having a diameter generally the same as the diameter of the manifold;
    using the resonant pulsation frequency to determine the choke tube dimensions for the side branch absorber; and
    attaching the side branch absorber to the one end of the manifold, such that the choke tube provides the only fluid communication between the manifold and the volume.

2. The method of claim 1, further comprising repeating the analyzing, determining, and attaching steps at a different engine operating condition, thereby providing multiple side branch absorbers.

3. The method of claim 1, wherein the steps are repeated at a different engine speed.

4. The method of claim 1, wherein the steps are repeated at a different engine order.

* * * * *